United States Patent [19]

Leach, Jr.

[11] Patent Number: 4,511,840
[45] Date of Patent: Apr. 16, 1985

[54] MOUNTING ASSEMBLY FOR A SPEED SENSOR

[75] Inventor: Earl A. Leach, Jr., Masonville, N.Y.

[73] Assignee: Allied Corporation, Morristown, Morristownship, N.J.

[21] Appl. No.: 392,924

[22] Filed: Jun. 28, 1982

[51] Int. Cl.³ .............................................. G01P 3/42
[52] U.S. Cl. .................... 324/160; 248/201; 248/DIG. 4
[58] Field of Search ............... 248/201, 205 R, 292.1, 248/162.1, DIG. 4; 324/166, 160, 173, 174; 403/166, 354, 355, 342

[56] References Cited

U.S. PATENT DOCUMENTS

| | | | |
|---|---|---|---|
| 1,609,189 | 11/1926 | Philpy | 403/166 |
| 2,517,967 | 8/1950 | Britton | 403/166 |
| 2,607,012 | 8/1952 | Siebert | 248/292.1 |
| 2,647,644 | 8/1953 | Cieslik | 403/166 |
| 2,657,400 | 11/1953 | Pagon | 403/166 |
| 2,901,237 | 8/1959 | Gruer | 403/166 |
| 3,090,600 | 5/1963 | Smith | 403/166 |
| 3,343,858 | 9/1967 | Rice | 403/166 |
| 3,759,472 | 9/1973 | Fratta | 248/201 |
| 3,928,802 | 12/1975 | Reinecke | 324/174 |
| 4,196,390 | 4/1980 | Pitkin | 324/173 |
| 4,302,724 | 11/1981 | Grover | 324/173 |

Primary Examiner—William H. Schultz
Assistant Examiner—Robert A. Olson

[57] ABSTRACT

A mounting assembly for a sensor (60) that senses the rotational speed of a drive shaft (70) of an aircraft turbine engine. The mounting assembly includes a bushing (30) slideably mounted within a portion of a tubular housing (10) and a spring (20) within the housing (10) for axially biasing the bushing (30). Pins (50) mounted to the housing (10) extend inwardly into slots (36) in the bushing (30) to prevent rotational movement of the bushing (30).

2 Claims, 3 Drawing Figures

U.S. Patent   Apr. 16, 1985   4,511,840
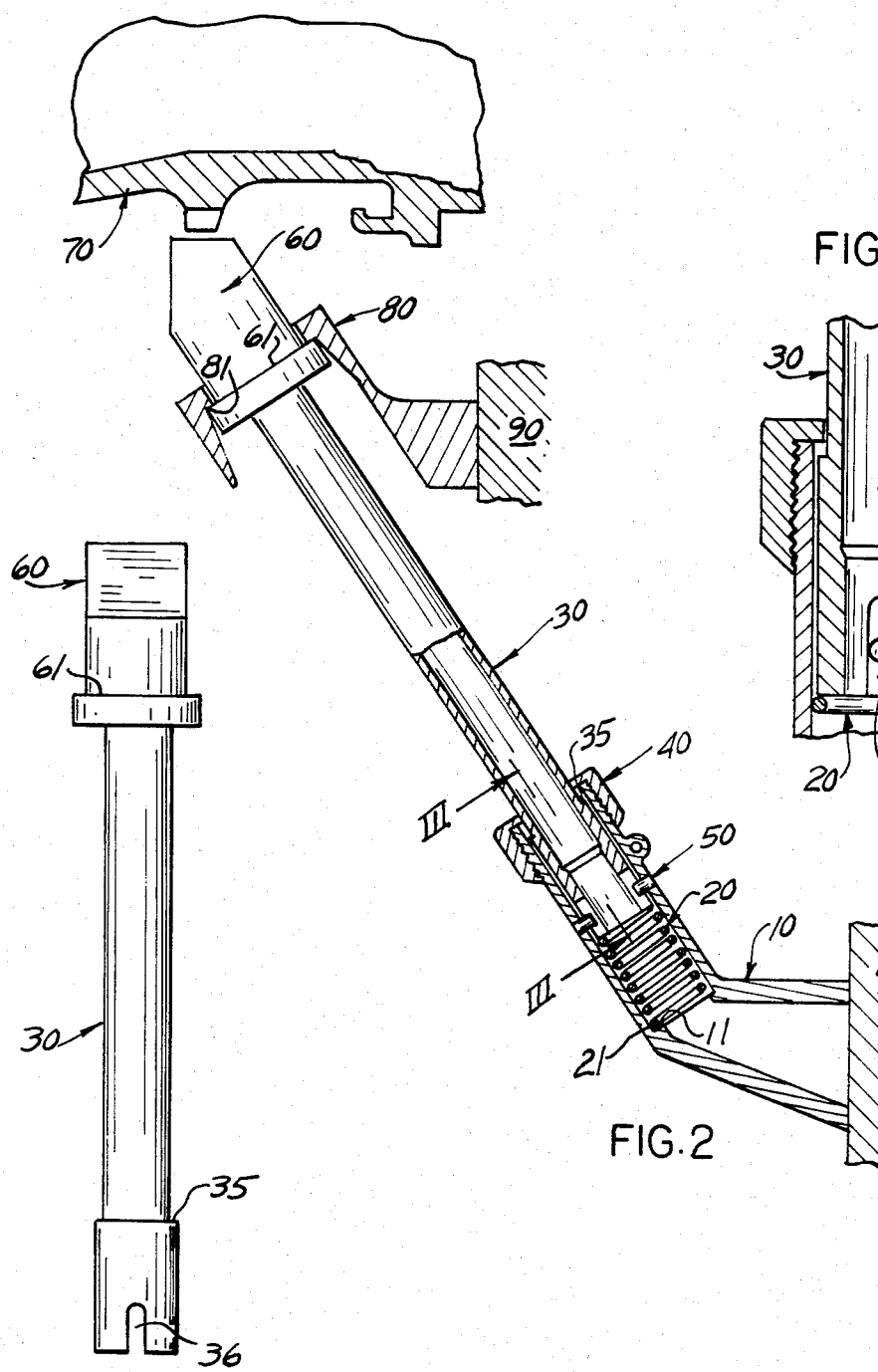
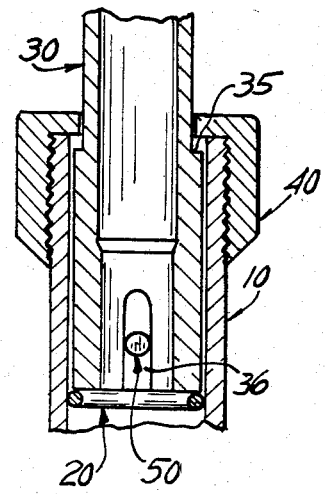
FIG. 1
FIG. 2
FIG. 3

MOUNTING ASSEMBLY FOR A SPEED SENSOR

This invention relates to a mounting assembly for a sensor that senses the rotational speed of a drive shaft of a turbine engine.

To sense the rotational speed of a turbine engine, it is necessary to mount a sensor in a fixed position and in close proximity to the drive shaft of the turbine engine. Because of vibration during engine operation and the expansion and contraction of the engine casing due to temperature changes, two brackets are required by the aircraft manufacturer to mount the sensor. Further, the sensor must be mounted external to the engine so that it can be removed for service while at the same time being held in a rigidly fixed position. To accomplish this the engine manufacturer further required that the sensor mounting assembly be axially biased against a bracket adjacent the drive shaft. One approach was to place a spring around the outside of the sensor mounting assembly which interacted with a spring cup at one end of the assembly and a bracket at the other end to urge the sensor into the forward bracket. However an external spring made the overall dimension of the assembly too wide. Further, a mounting assembly with an external spring and a forward spring cup added additional expense to the assembly and weight to the aircraft both of which are undesirable. Still further, the assembly of a mounting assembly with an external spring was complicated because it required the spring to be assembled onto a portion of a bushing before the remaining portion of the bushing was brazed together.

DISCLOSURE OF THE INVENTION

This invention provides a speed sensor mounting assembly for a turbine engine that is smaller in size, less expensive, lighter in weight and less complicated to assemble than prior mounting assemblies. The invention is a tubular mounting assembly characterized by an internal spring within the assembly that axially biases the forward portion of the tubular assembly having the sensor mounted thereon.

Accordingly, it is an advantage of this invention to provide a smaller, lighter, and less expensive sensor mounting assembly for mounting a speed sensor to the casing of a turbine engine.

DETAILED DESCRIPTION OF THE INVENTION

FIG. 1 illustrates a bushing used in the mounting assembly.

FIG. 2 is a partial cross sectional view of a sensor mounting assembly incorporating the principles of the invention.

FIG. 3 illustrates an enlarged cross sectional view of a portion of the mounting assembly.

Referring now to the drawings, FIG. 1 illustrates a bushing 30 that is used in the sensor mounting assembly. One end of the bushing 30 includes a shoulder 35 and one or more axially extending slots 36 which are adapted to receive a pin (50, FIG. 2). The other end of the bushing includes a shoulder 61 and a sensor 60 mounted to the bushing 30.

FIG. 2 illustrates a mounting assembly for a speed sensor 60 which includes a tubular housing 10; a bushing 30; means for slideably mounting 35, 40 an end portion of the bushing 30 in said housing 10; and means for biasing 20 said bushing 30 in an axial direction. The mounting assembly is mounted adjacent to the drive shaft 70 of a turbine engine by a forward mounting bracket 80 and a rear mounting bracket 90 that mounts to the engine casing. The housing 10 includes an inner shoulder 11 which abuts against one end 21 of the spring 20. The bushing 30 is comprised of two pieces brazed together so that there is a shoulder (35, FIG. 3) that engages a nut 40 to retain an end portion of the bushing 30 within said housing 10. Pins 50 mounted to said housing 10 extend inwardly to engage a respective slot (36, FIG. 1) in the bushing 30 to prevent rotation of said bushing 30. The spring 20, pins 50 and slots 36 coact to maintain the sensor 60 in proper orientation to a particular portion of the engine drive shaft 70. The other end 22 of the spring 20 engages the end of the bushing 30 so that when the bushing 30 is moved axially towards the spring 20, the spring 20 biases the sensor 60 at the other end of the bushing 30 in an axial direction. The axial biasing of the sensor 60 keeps a shoulder 61 of the sensor 60 against a shoulder 81 of the forward bracket 80.

FIG. 3 illustrates how the shoulder 35 on the bushing 30 coacts with an inner surface of the nut 40 to retain the bushing 30 within the housing. It also illustrates how the pins 50 would travel in the slots 36 as the bushing 30 moves axially.

While a preferred embodiment of this invention has been disclosed, it will be apparent to those skilled in the art, that changes may be made to the invention as set forth in the appended claims, and in some instances, certain features of the invention may be used to advantage without corresponding use of other features. For instance, the spring 20 could be replaced by a resiliently deflectable member. Accordingly, it is intended that the illustrative and descriptive materials herein be used to illustrate the principals of the invention and not to limit the scope thereof.

Having described the invention what is claimed is:

1. A mounting assembly for a speed sensor comprising:
   a tubular housing having an internal shoulder therein;
   a spring located in said housing, one end of said spring engaging the internal shoulder in said housing;
   a bushing;
   means for slideably mounting an end portion of said bushing in said housing so that one end of said bushing engages the other end of said spring;
   means for sensing rotational movement of a member and providing an electrical signal that is a function of the rotational speed thereof, said sensing means mounted to the other end of said bushing;
   a bracket spaced from said housing and mounted adjacent said member, said bracket having an opening therein through which an end portion of said sensing means extends so that said sensing means is in a fixed position at a predetermined distance from said member;
   means for mounting said housing adjacent said bracket so that said other end portion of said housing having said sensor mounted thereto engages the bracket and compresses said spring; and
   means for preventing rotational movement of said bushing.

2. The mounting assembly as recited in claim 1 wherein said means for preventing rotational movement comprises:
   at least one axially extending slot in said bushing; and
   at least one inwardly extending pin mounted to said housing, each of said pins engaging a respective slot in said bushing.

* * * * *